United States Patent
Kusafuka et al.

(10) Patent No.: US 6,589,133 B2
(45) Date of Patent: Jul. 8, 2003

(54) RANGE SWITCHOVER APPARATUS FOR AUTOMATIC TRANSMISSION

(75) Inventors: Muneo Kusafuka, Anjo (JP); Yoshitaka Murase, Anjo (JP); Hirotoshi Eishima, Anjo (JP); Kazuo Takemoto, Anjo (JP); Naoki Ohkoshi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/750,488

(22) Filed: Dec. 20, 2000

(65) Prior Publication Data
US 2001/0039227 A1 Nov. 8, 2001

(30) Foreign Application Priority Data
Dec. 27, 1999 (JP) ............................................. 11-371509

(51) Int. Cl.[7] ............................................. F16H 59/72
(52) U.S. Cl. .............................. 477/97; 477/98; 74/335
(58) Field of Search ............................ 74/335, 473.12, 74/473.28; 479/116, 97, 98

(56) References Cited

U.S. PATENT DOCUMENTS

| | | | |
|---|---|---|---|
| 4,523,281 A | 6/1985 | Noda et al. | |
| 4,693,143 A | 9/1987 | Harada et al. | |
| 4,724,725 A | 2/1988 | Harada et al. | |
| 5,094,115 A | * 3/1992 | Michihira et al. | 475/7 |
| 5,370,015 A | * 12/1994 | Moscatelli | 324/207.2 |
| 5,689,994 A | * 11/1997 | Nagai et al. | 310/80 |
| 6,141,494 A | * 10/2000 | Nishino et al. | 388/811 |
| 6,157,884 A | * 12/2000 | Narita et al. | 477/34 |
| 6,230,576 B1 | * 5/2001 | Yamada et al. | 74/335 |

FOREIGN PATENT DOCUMENTS

JP 7-190180 7/1995

* cited by examiner

Primary Examiner—Rodney H. Bonck
Assistant Examiner—Eric M Williams
(74) Attorney, Agent, or Firm—Oliff & Berridge, PLC (57) ABSTRACT

A range switchover apparatus includes a detent mechanism for holding in respective shift positions a range switchover operating unit capable of switching over a switchover device, which switches over a shift range, among respective shift positions, a driving force stopping unit for preventing a driving force from the drive motor from being transmitted to the range switchover operating unit, a stoppage controlling unit adapted to detect a position of the range switchover operating unit to control the driving force stopping unit so as to hold the range switchover operating unit in a predetermined shift position of the detent mechanism, an environment detecting unit for detecting an environment of the drive motor, and a rotation controlling unit for controlling the drive motor at a predetermined rotational speed in response to a state of the environment detected by the environment detecting unit. The range switchover apparatus enables sure performance of the switchover of the switchover device of an automatic transmission.

6 Claims, 9 Drawing Sheets

| Voltage(V) / Oil Temp.(°C) | 8 | 10 | 12 | 14 | 16 |
|---|---|---|---|---|---|
| -40 | 90 | 90 | 90 | 90 | 80 |
| -20 | 90 | 90 | 90 | 90 | 80 |
| 0 | 90 | 90 | 90 | 90 | 60 |
| 20 | 90 | 90 | 80 | 90 | 40 |
| 80 | 90 | 90 | 80 | 70 | 40 |
| 120 | 90 | 90 | 80 | 60 | 40 |

Duty Ratio (%)

RANGE SWITCHOVER APPARATUS FOR AUTOMATIC TRANSMISSION

BACKGROUND OF THE INVENTION

1. Field of Invention

The invention relates to a range switchover apparatus for use in switching of a running range of an automatic transmission.

2. Description of Related Art

Conventionally, a range switchover apparatus for switchover of a running range of an automatic transmission comprises a manual valve in the automatic transmission, and a shift lever connected to the manual valve by a shift cable and provided in the vehicle interior. The range switchover apparatus is structured such that a driver operates the shift lever to thereby switch over the manual valve via the shift cable. However, it has become necessary to increase the freedom in placement of the shift lever as a result of the recent increases in more freedom for vehicle interior design and an increase in the types or models of a car using the same platform.

A range switchover apparatus, which meets with such a demand, is disclosed in Japanese Patent Laid-Open No. 190180/1995. With such a range switchover apparatus, a motor is used to actuate a manual valve to perform switchover of the running ranges, and driving of the switching motor is stopped upon detection of the manual valve being placed in a target position.

However, because conventional range switchover apparatuses are controlled independently of the rotational speed of the switching motor, in the case where the rotational speed of the switching motor is too great, the target position is in some cases passed greatly due to an increase in inertial forces of respective constituent members even when the manual valve stops the switching motor at the target position.

SUMMARY OF THE INVENTION

The invention has as its object to provide a range switchover apparatus capable of surely performing the switchover of a switchover means of an automatic transmission.

The above-mentioned problems are solved by a range switchover apparatus for automatic transmissions, according to a first aspect, comprising a range switchover means operating unit capable of switching over a switchover means, which switches over a shift range, among respective shift positions; a detent mechanism for holding the range switchover means operating unit in the respective shift positions; a drive motor for driving the range switchover means operating unit; a driving force stopping unit for preventing a driving force from the drive motor from being transmitted to the range switchover means operating unit; a stoppage controlling unit adapted to detect a position of the range switchover means operating unit to control the driving force stopping unit so as to hold the range switchover means operating unit in a predetermined shift position; an environment detecting unit for detecting an environment of the drive motor; and a rotation controlling unit for controlling the drive motor at a predetermined rotational speed in response to a state of the environment detected by the environment detecting unit.

The invention according to a second aspect comprises a range switchover apparatus for automatic transmissions wherein the detent mechanism comprises a plurality of recesses provided on the range switchover means operating unit to correspond to the shift positions, and an engagement member capable of selectively engaging with and disengaging from the recesses, and the engagement member detects a position corresponding to an inlet of a recess corresponding to the predetermined shift position whereby the stoppage controlling unit transmits a stoppage signal to the driving force stopping unit.

The invention according to a third aspect comprises a range switchover apparatus for automatic transmissions wherein the driving force stopping unit stops the drive motor and actuates a brake.

The invention according to a fourth aspect comprises a range switchover apparatus for automatic transmissions wherein the driving force stopping unit comprises a clutch for cutting off a driving force from the drive motor to the switchover means driving unit.

The invention according to a fifth aspect comprises a range switchover apparatus for automatic transmissions wherein the environment detecting unit comprises a voltage measuring device for measuring an electric source voltage of the drive motor.

The invention according to a sixth aspect comprises a range switchover apparatus for automatic transmissions wherein the environment detecting unit comprises a temperature measuring device for measuring an oil temperature in the automatic transmission.

BRIEF DESCRIPTION OF THE DRAWINGS

The invention will be described in conjunction with the following drawings in which like features are designated with like reference characters, and wherein.

DETAILED DESCRIPTION OF PREFERRED EMBODIMENTS

When the drive motor 12 is started, the range switchover means operating unit 7 is actuated toward desired shift positions (P, R, N, D, L) to switch over the switchover means 2, 5, the switchover means in this exemplary embodiment includes a switchover valve 2 and a detent lever 5. Simultaneously, the detent mechanism 8 repeats the operations of holding and releasing the range switchover means operating unit 7 in a shift position (P, R, N, D, L), which the range switchover means operating unit 7 passes until it is switched over to a new shift position (P, R, N, D, L). Each time the range switchover means operating unit 7 is switched over to a new shift position (P, R, N, D, L), the switchover is detected by the stoppage controlling unit 31, 28.

When the range switchover means operating unit 7 is switched over to a desired shift position (P, R, N, D, L), the stoppage controlling unit 31, 28 actuates the driving force stopping unit 31, 18, or 31, 19 to prevent a driving force from the drive motor 12 to the range switchover means operating unit 7. The range switchover means operating unit 7 stops the switchover operation of the switchover means 2, 5 and is held in a desired shift position (P, R, N, D, L) by the detent mechanism 8. Thus, the range switchover apparatus 1 or 100 switches the automatic transmission to a desired shift position.

However, the rotational speed of the motor 12 changes depending upon the environment, such as a fluctuation in the battery voltage, the temperature of the working oil in the automatic transmission, and the like. Meanwhile, a time-lapse during deceleration and stoppage is inevitable due to inertia of respective parts until the range switchover means operating unit 7 actually stops after the driving force stopping unit 31, 18 or 31, 19, such as a brake, clutch or the like, is actuated to prevent the driving force from the drive motor 12 being applied to the switchover means driving unit 7. Such time-lapse varies depending upon the rotational speed of the motor, and so the detent mechanism 8 cannot, in some cases, hold the range switchover means operating unit 7 in a desired shift position (P, R, N, D, L) correctly depending upon the duration of deceleration and stoppage.

Hereupon, the rotation controlling unit 20 adjusts the drive motor 12 so as to make the drive motor 12 rotate at a predetermined rotational speed, as by changing the duty ratio of the drive motor 12 in response to a change in the environment, detected by the environment detecting unit 24, 27. Thereby, the duration of deceleration and stoppage becomes constant at all times, and so the detent mechanism 8 correctly holds the range switchover means operating unit 7 in a desired shift position (P, R, N, D, L).

The reference numbers used are for convenience, and easy correspondence with the drawings, and are not intended to limit the structure of the invention. A range switchover apparatus according to embodiments of the invention will be explained with reference to the drawings.

Figure 1:
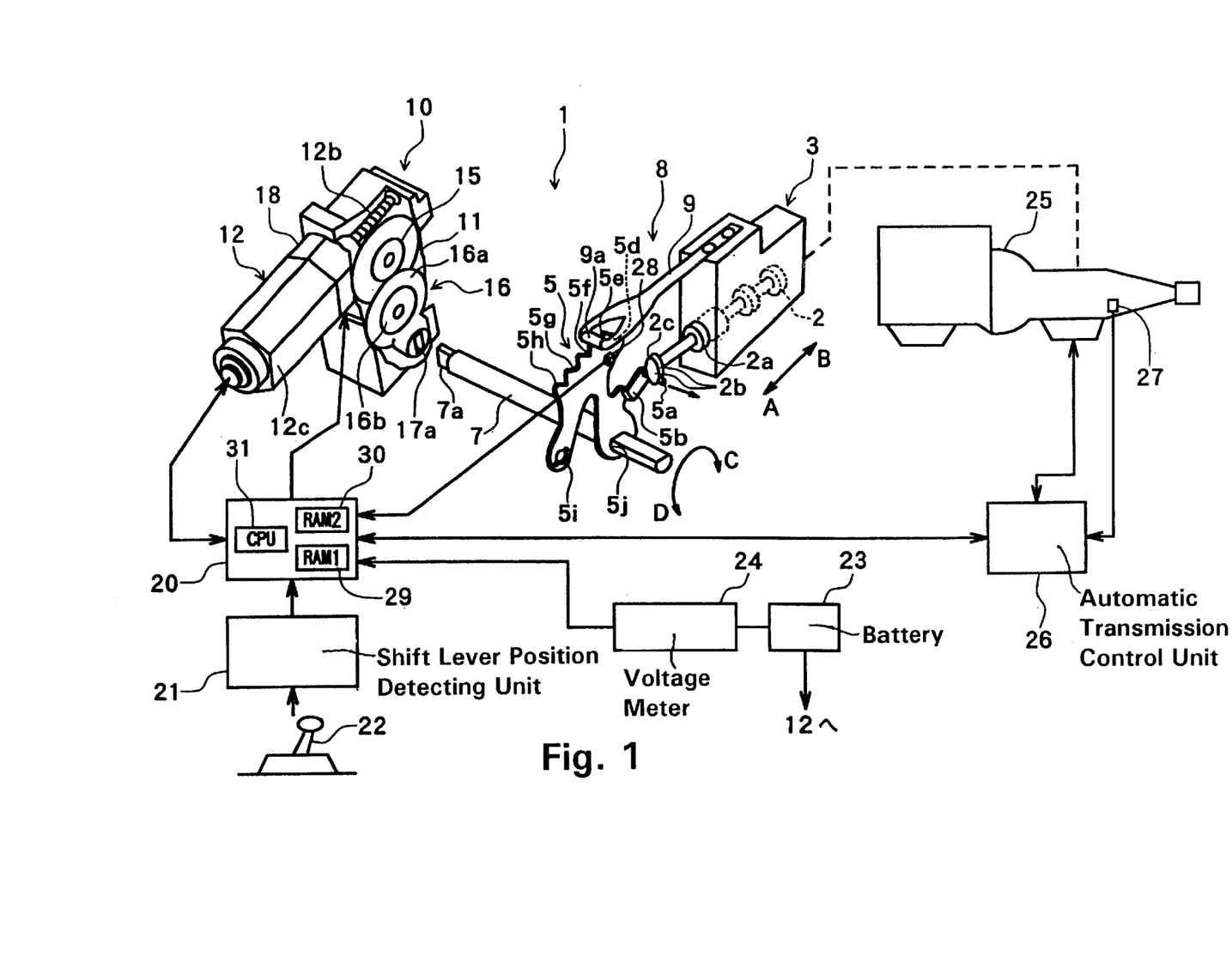
FIG. 1 is a diagrammatic view showing an entire range switchover apparatus according to a first embodiment of the invention.

FIG. 1 is a diagrammatic view of a first embodiment of a range switchover apparatus 1 of an automatic transmission. The range switchover apparatus 1 is adapted to actuate a manual valve 2, which serves as a switchover valve and constitutes a part of an automatic transmission, such as multistage type automatic transmissions and continuously variable transmissions (CVT). The manual valve 2 is contained in a valve body 3, which constitutes a part of the automatic transmission. The manual valve 2 is provided within the valve body 3 to be movable in the directions indicated by arrows A and B, corresponding to an axial direction of a spool 2a of the valve. The automatic transmission can be sequentially switched over to P, R, N, D and L ranges from the arrow B side to the arrow A side of FIG. 1 by moving the manual valve 2 in the direction of the arrows A and B. An engagement groove 2c defined by two circular disks 2b, 2b is formed on a tip end of the manual valve 2 at the side of the arrow A. A detent lever 5 engages with the engagement groove 2c via a pin 5a provided on an arm portion 5b of the detent lever 5. The detent lever 5 and the manual valve 2 form the switchover means 2, 5.

Figure 2:
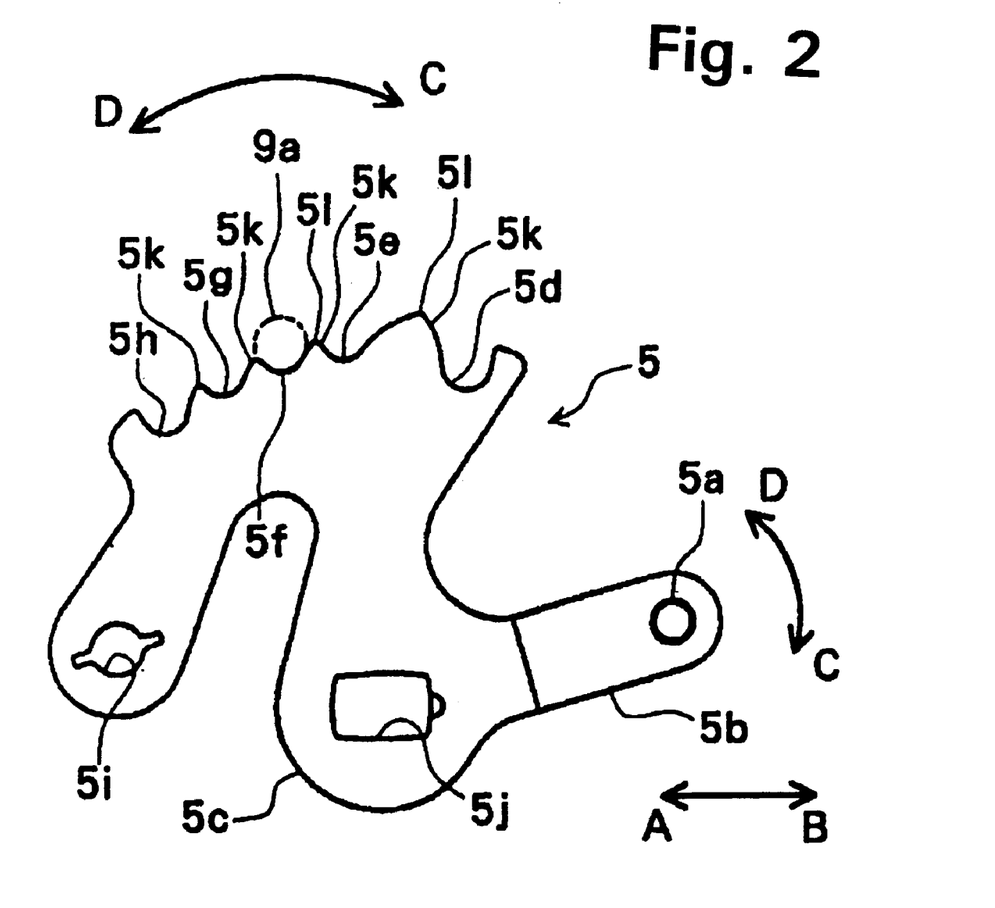
FIG. 2 is an enlarged view showing a detent lever.

The detent lever 5 has a sheet-shaped body 5c as shown in FIG. 2. Five range engagement grooves 5d, 5e, 5f, 5g, 5h are formed at predetermined spacings on an upper portion of the body 5c as viewed in the figure. The respective range engagement grooves 5d, 5e, 5f, 5g, 5h are arranged in order from right to left in the figure to correspond to the ranges "P", "R", "N", "D" and "L" of the automatic transmission. Also, the arm portion 5b, provided with the above-mentioned pin 5a, projects rightward of the body 5c as viewed in the figure. A parking rod engaging hole 5i for driving a parking mechanism in the P range (not shown) is formed in and extends through a leftward portion of the body 5c as viewed in the figure. Also, a rectangular-shaped engagement hole 5j, through which a range control shaft 7 described later is inserted, is formed in and extended through a substantially central portion of the body.

Provided on an upper portion of the five range engagement grooves 5d, 5e, 5f, 5g, 5h of the body 5c is a detent spring 9 composed of a sheet spring, fixed at one end to the valve body 3, a casing of the automatic transmission or the like. A roller (engagement member) 9a, rotatably supported on a tip end of the detent spring 9, is biased downward in FIG. 1 by the elasticity of the detent spring 9, to fit into and engage with one of five range engagement grooves 5d, 5e, 5f, 5g, 5h. Also, the rod-shaped range control shaft (range switchover means operating unit) 7 engages with the engagement hole 5j of the body 5c and is made integral with the detent lever 5. The detent lever 5 and the detent spring 9 constitute a detent mechanism 8.

The range control shaft 7 is formed at its left tip end with an engaging portion 7a having a rectangular-shaped cross section. A valve drive device 10 is connected to the engaging portion 7a. The valve drive device 10 is mounted on a cover of the automatic transmission or the like. The valve drive device 10 has a box-shaped casing 11. The casing 11 mounts thereon the DC drive motor 12. The drive motor 12 is provided with a brake 18 for rapidly stopping the rotation of the motor. A worm gear 12b is mounted on an output shaft of the drive motor 12. The worm gear 12b meshes with a worm wheel (not shown), which is rotatably supported on the casing 11. A gear 15 is provided on the worm wheel to rotate together with the worm wheel.

A large gear 16a of a two-stage gear 16, rotatably supported on the casing 11, meshes with the gear 15. The two-stage gear 16 also has a small gear 16b, having a half of a pitch circle radius of the large gear 16a, and is formed coaxially and integrally with the large gear 16a.

The small gear 16b meshes with an output gear (not shown), which has a pitch circle radius four times that of the small gear 16b. The output gear is rotatably supported on the casing 11. Further, the output gear is formed centrally thereof with a rectangular-shaped engagement hole 17a. The above-mentioned engaging portion 7a of the range control shaft 7 fits into and engages with the engagement hole 17a.

Connected to the drive motor 12 and the brake 18 is the range control unit (rotation controlling unit) 20 for controlling the entire range of switchover apparatus 1. The range control unit 20 is connected to a shift lever position detecting unit 21. The shift lever position detecting unit 21 is connected to a shift lever 22. Also connected to the range control unit 20 is a voltage meter (part of an environment detecting unit) 24 for measuring a voltage of a battery 23 connected to the motor 12.

Further, connected to the range control unit 20 is an automatic transmission control unit 26 for controlling an automatic transmission 25. Connected to the automatic transmission control unit 26 is an oil temperature sensor (a further part of the environment detecting unit) 27, which is provided in the automatic transmission 25 to measure the temperature of the working oil. Also, connected to the range control unit 20 is a position sensor (stoppage controlling unit) 28, which is provided on a stationary member (not shown) to detect the positions of the range engagement grooves 5d, 5e, 5f, 5g, 5h of the detent lever 5. The position sensor 28 detects a body 36 (FIG. 5), provided on the inlets, described later, of the respective range engagement grooves 5d, 5e, 5f, 5g, 5h to detect the range engagement grooves 5d, 5e, 5f, 5g, 5h.

The range control unit 20 comprises, as shown in FIG. 1, a RAM 1 29 for storing a battery voltage measured by the voltage meter 24, a RAM2 30 for storing an oil temperature of the automatic transmission 25 measured by the oil temperature sensor 27, and a CPU (driving force stopping unit, stoppage controlling unit) 31 for storing a duty ratio of the motor 12 and controlling the rotational speed of the motor 12 on the basis of the duty ratio and for controlling the operation of the brake 19.

Figure 4:
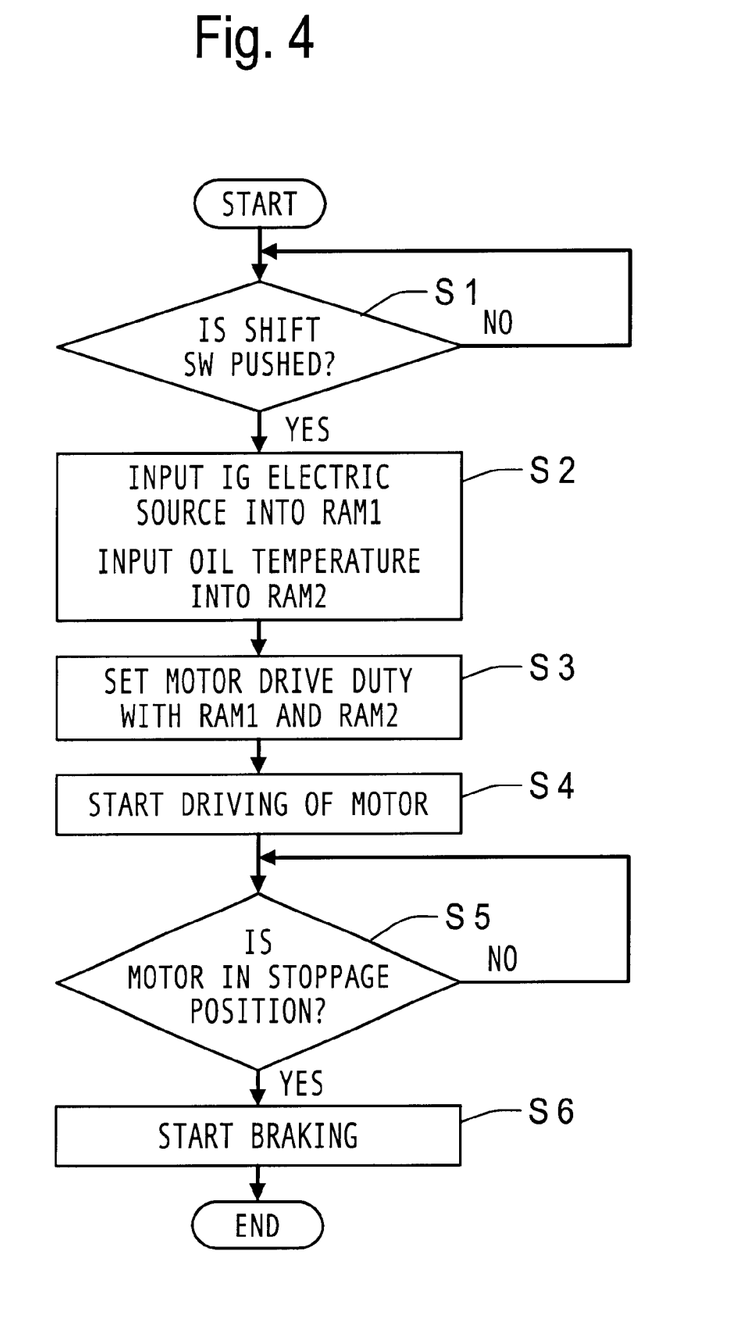
FIG. 4 is an operation flowchart of the range switchover apparatus of FIG. 1.

An explanation of the operation will be given on the basis of the flowchart of FIG. 4. At the start of or during the running of a vehicle, when, in step S1, the shift lever 22 is switched over, the shift lever position detecting unit 21 detects a switchover position of the shift lever 22 and informs the CPU 31 of the range control unit 20 of the switchover. The CPU 31 starts the motor 12 to rotate the detent lever 5 to a position where the range engagement grooves 5d, 5e, 5f, 5g, 5h corresponding to switchover positions of the shift lever can engage with the roller 9a in step S2.

At this time, information about the battery voltage measured by the voltage meter 24 is stored in the RAM1 29, and information about the temperature of the working oil in the automatic transmission 25, measured by the oil temperature sensor 27, is stored in the RAM2 30.

The CPU 31 sets a duty ratio using the information about the battery voltage and the oil temperature on the basis of TABLE of duty ratios (shown in FIG. 3) in step S3. The duty ratio is a ratio of a movable time to a total time, for example, in a given time. In step S4, the motor 12 is driven to rotate forward or rearward at a rotational speed corresponding to the duty ratio. Then the range control shaft 7 rotates a predetermined angle in a direction of arrow C or D (FIG. 1) via the worm gear 12b, worm wheel (not shown), gear 15, two-stage gear 16, and output gear (not shown). The detent lever 5, pin 5a, and the arm portion 5b also rotate in the direction of the arrow C or D. When the pin 5a has rotated a predetermined angle, the spool 2a of the manual valve 2, engaged with the pin 5a via the engagement groove 2c, is moved in a direction of the arrow A or B. The range of the manual valve 2 is sequentially switched over to the P, R, N, D, L ranges from the side of the arrow B.

In the course of such a switchover, the position sensor 28 sequentially detects the range engagement grooves 5d, 5e, 5f, 5g, 5h which engage with the roller 9a. When the position sensor 28 has detected the range engagement groove corresponding to the switchover range of the shift lever 21, in step S5, the CPU 31 cuts off the electric source to the motor 12 to actuate the brake 18, in step S6, to stop the motor 12. Accordingly, the manual valve 2 is switched over to a range corresponding to the switchover range of the shift lever 21.

During the operation, when the CPU 31 stops the motor 12 with the brake 18, the detent lever 5 stops rotating. During a time interval until the detent lever actually stops its rotation, after the motor 12 is stopped, the detent lever 5 may rotate due to inertia of respective parts and stop its rotation before the roller 9a falls down into a valley of the range engagement groove or after the roller passes the valley of the range engagement groove. In such a case, range switchover of the manual valve 2 may become incorrect and so the switchover operation of the automatic transmission 25 may not be effected smoothly.

Figure 5:
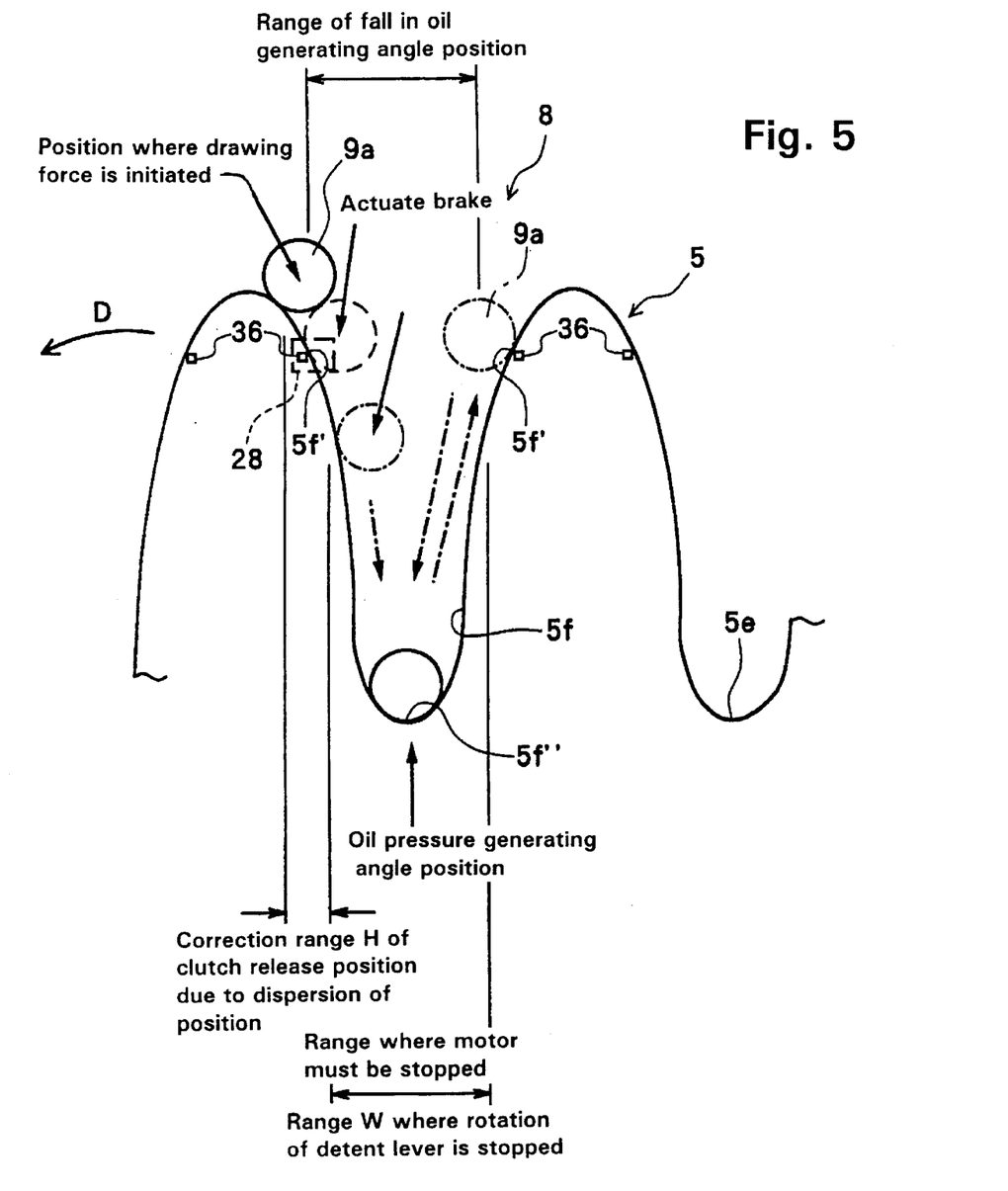
FIG. 5 is a view illustrating the operation of a detent mechanism in the range switchover apparatus of FIG. 1.

The range switchover apparatus 1 according to the embodiment takes account of inertia of the respective parts such that when the detent lever 5 rotates in a direction of an arrow D as shown in FIG. 5, the position sensor 28 detects the roller 9a being caused, by the elastic force of the detent spring 9, to pass a position where the detent lever 5 is drawn in, and an inlet portion 5f' of the range engagement groove 5f (for this example, range engagement groove 5f is used) coming to contact the roller 9a, and cuts off the electric source to the motor 12 to actuate the brake 18, thereby causing a valley 5f" to bear the roller 9a.

In addition, because it is difficult for the valley 5f" to surely bear the roller 9a, the range engagement groove 5f bears the roller 9a in some region (a detent lever rotation stopping region W) around the valley 5f". The region W is within the range of error in range switchover of the manual valve 2, and is one in which oil pressure is generated due to the range switchover of the manual valve 2.

However, even when the timing for stopping the motor 12 is set taking account of inertia of the respective parts, the roller 9a cannot, in some cases, be born within the detent lever rotation stopping region W because the rotational speed of the motor 12 changes due to changes in the environment, such as fluctuation in battery voltage, influences due to heat of the working oil in the automatic transmission and the like.

In order to prevent such inconvenience, with the range switchover apparatus 1 according to the invention, in steps S2 and S3, the CPU 31 further selects a duty ratio (FIG. 3) in accordance with the battery voltage and the oil temperature in the automatic transmission to control the rotational speed of the motor 12 on the basis of the duty ratio and to actuate the brake 19 in a correction region H for the braking position, shown in FIG. 5, to surely bear the roller 9a within the detent lever rotation stopping region W.

Although the range switchover apparatus 1 according to the first embodiment stops the motor and actuates the brake when rotation of the detent lever 5 should be stopped, a range switchover apparatus 100 (FIG. 6) according to a second embodiment provides a clutch (driving force stopping unit) 19 in place of the brake 18, and stops the rotation of the detent lever 5 by releasing the clutch 19 and cutting off transmission of the driving force of the drive motor.

Figure 6:
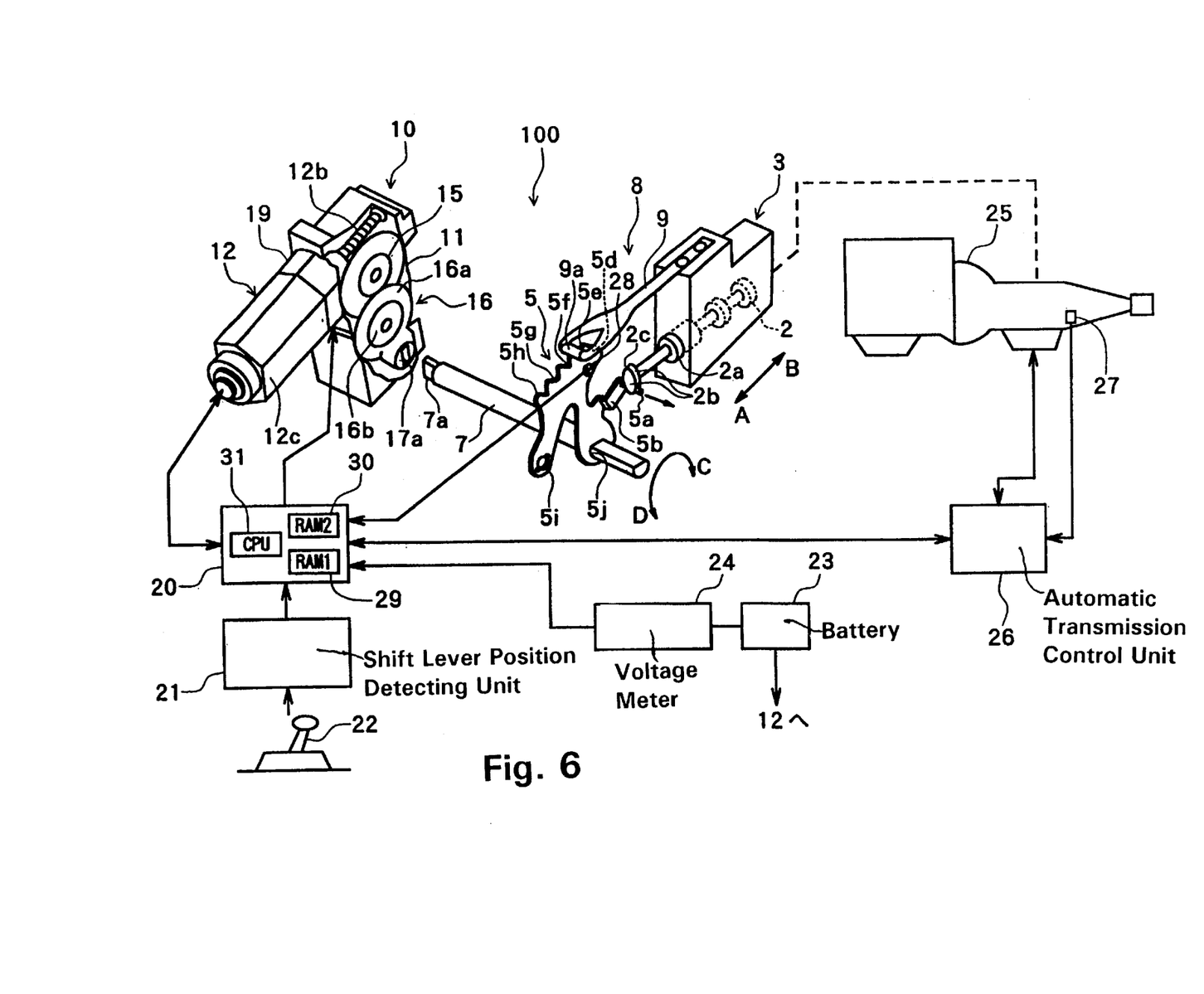
FIG. 6 is a diagrammatic view showing an entire range switchover apparatus according to a second embodiment of the invention.

In addition, the range switchover apparatus 100, according to the second embodiment, is structured such that the clutch 19 is provided in place of the brake 18, of the range switchover apparatus 1 of the first embodiment, and the CPU 31 controls the release and actuation of the clutch 19. The same parts as those in the range switchover apparatus 1 according to the first embodiment are designated by the same characters with an explanation thereof being omitted.

Figure 7:
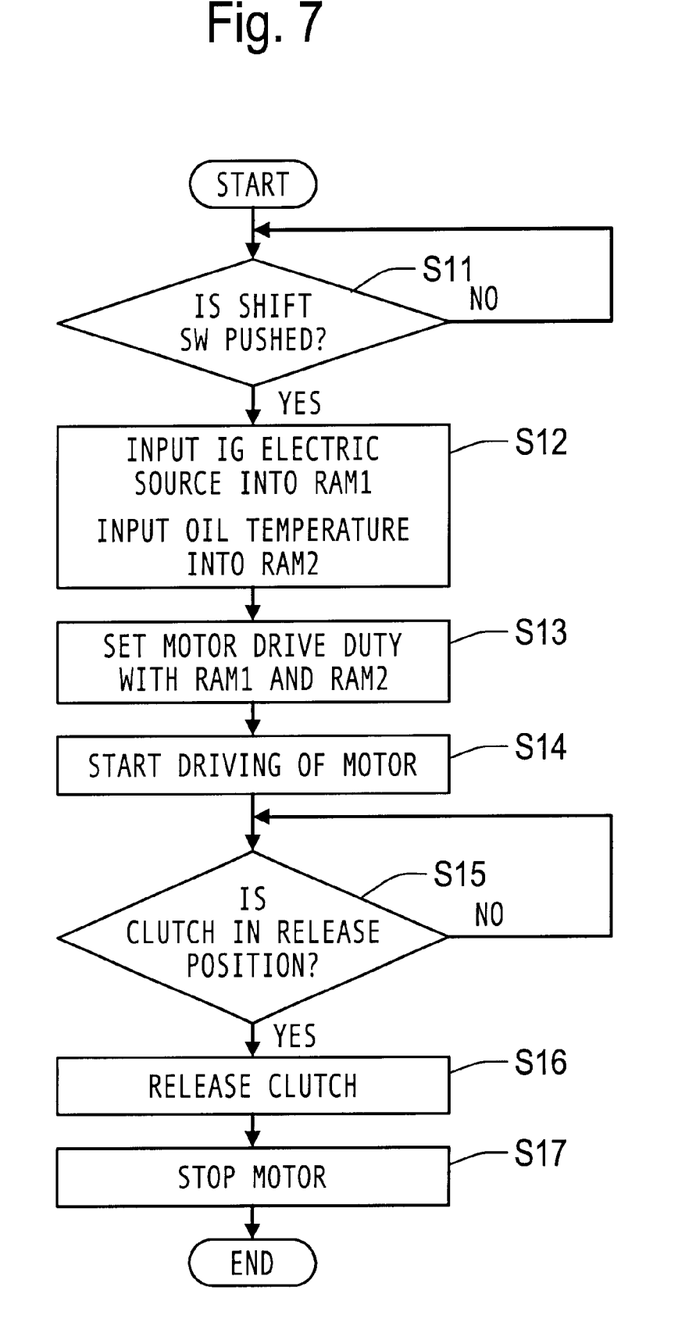
FIG. 7 is an operation flowchart of the range switchover apparatus of FIG. 6.

An explanation of the operation of the second embodiment will be given on the basis of the flowchart shown in FIG. 7. At the start of or during the running of a vehicle, when the shift lever 22 is switched over (step S11), the shift lever position detecting unit 21 detects a switchover position of the shift lever 22 and informs the CPU 31 of the range control unit 20 of the position. The CPU 31 starts the motor 12 so as to rotate the detent lever 5 to a position where the range engagement grooves 5d, 5e, 5f, 5g, 5h, corresponding to switchover positions of the shift lever, can engage with the roller 9a.

At this time, in step S12, information about battery voltage, measured by the voltage meter 24, is stored in the RAM1 29, and information about the temperature of the working oil in the automatic transmission 25, measured by the oil temperature sensor 27, is stored in the RAM2 30.

Figure 3:
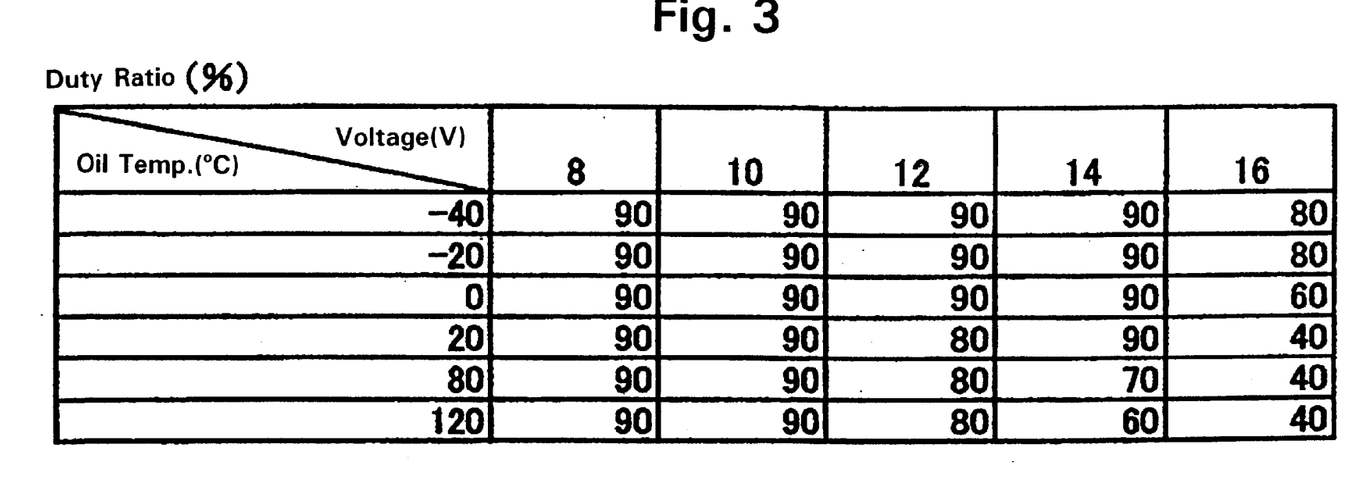
FIG. 3 is a table indicating a duty ratio of a motor on the basis of a battery voltage and a temperature of a working oil in an automatic transmission.

In step S13, the CPU 31 sets a duty ratio from the information about the battery voltage and the oil temperature on the basis of the TABLE of duty ratios shown in FIG. 3. The motor 12 is driven in step S14 to rotate forward or rearward at a rotational speed corresponding to the duty ratio. Then the torque of the motor 12 is transmitted to the worm gear 12b, worm wheel (not shown), gear 15, two-stage gear 16, output gear (not shown) and the range control shaft 7. The spool 2a of the manual valve 2 is moved in a direction of the arrow A or B by the pin 5a. The range of the manual valve 2 is sequentially switched over to the P, R, N, D, L ranges from the side of the arrow B.

In the course of such a switchover, the position sensor 28 sequentially detects the range engagement grooves 5d, 5e, 5f, 5g, 5h which engage with the roller 9a. When the position sensor 28 has detected the range engagement groove corresponding to the switchover range of the shift lever 21 in step S15, the CPU 31 releases the clutch 19, in step S16, to stop the motor 12, step S17. Accordingly, the manual valve 2 is switched over to a range corresponding to the switchover range of the shift lever 21.

In the operation, when the CPU 31 releases the clutch 19, transmission of the driving force of the drive motor is cut off, and the detent lever 5 stops its rotation. During a time interval until the detent lever 5 actually stops its rotation after the clutch 19 is released, the detent lever 5 may rotate due to inertia of the respective parts and stop its rotation without the roller 9a surely falling down into a valley of the range engagement groove.

The range switchover apparatus 100 according to the embodiment also takes account of inertia of the respective parts, such that as shown in FIG. 5. The position sensor 28 detects the inlet 5f' of the range engagement groove 5f (again range engagement groove 5f is used in the exemplary groove) coming to the roller 9a so that the roller 9a is born in some region (a detent lever rotation stopping region W) around the valley 5f'' of the range engagement groove 5f.

Figure 8:
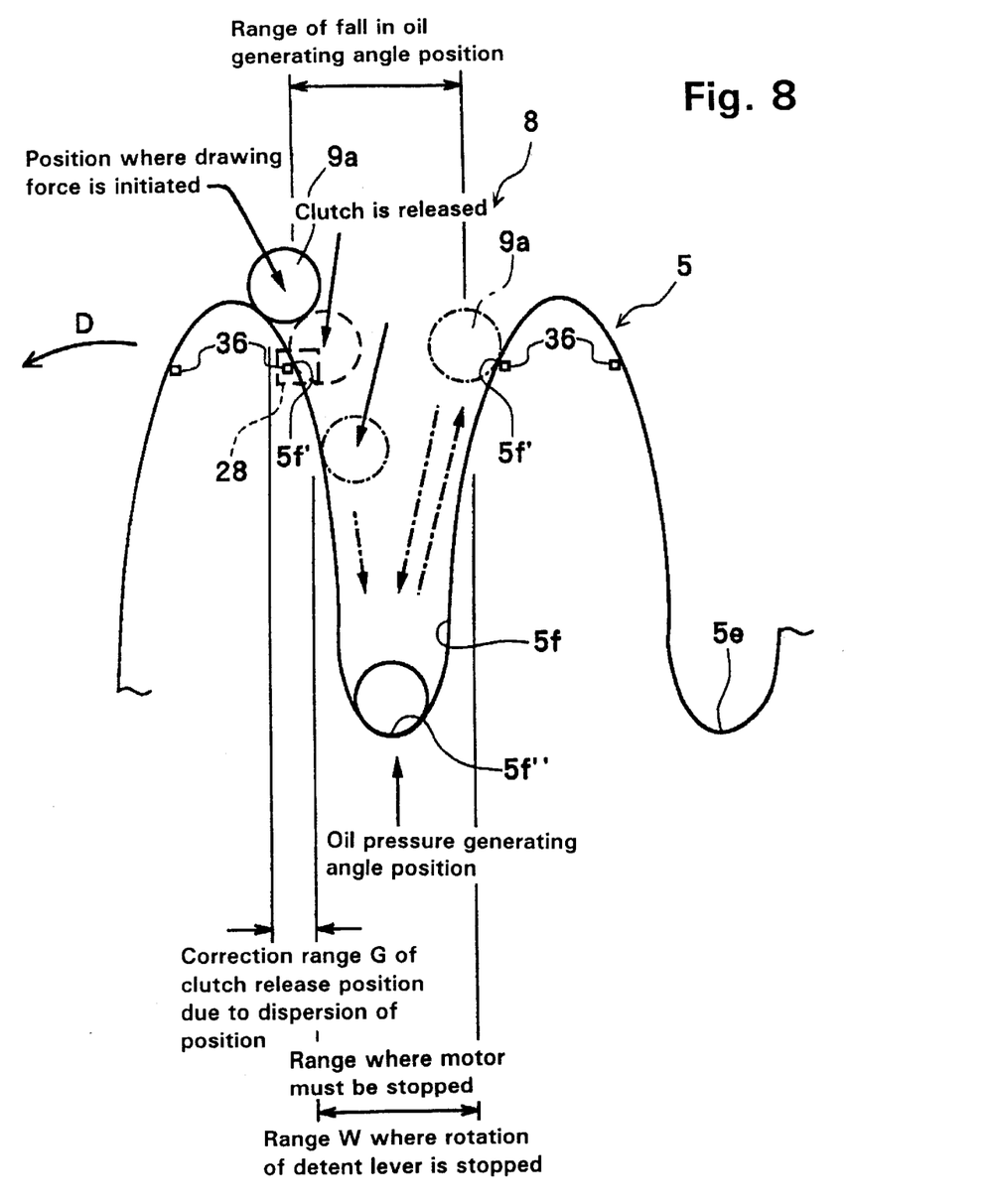
FIG. 8 is a view illustrating the operation of a detent mechanism in the range switchover apparatus of FIG. 6.

However, because the rotational speed of the motor 12 changes due to changes in the environment, such as fluctuation in battery voltage, influences due to heat of the working oil in the automatic transmission and the like, in steps S12 and S13, the CPU 31 selects a duty ratio, using the map of FIG. 3, in accordance with the battery voltage and the oil temperature in the automatic transmission to control the rotational speed of the motor 12 on the basis of the duty ratio. Therefore, the range switchover apparatus 100, according to the invention, actuates the clutch 19 in a correction region G for the clutch release position, shown in FIG. 8, to surely stop and support the roller 9a within the detent lever rotation stopping region W.

Figure 9:
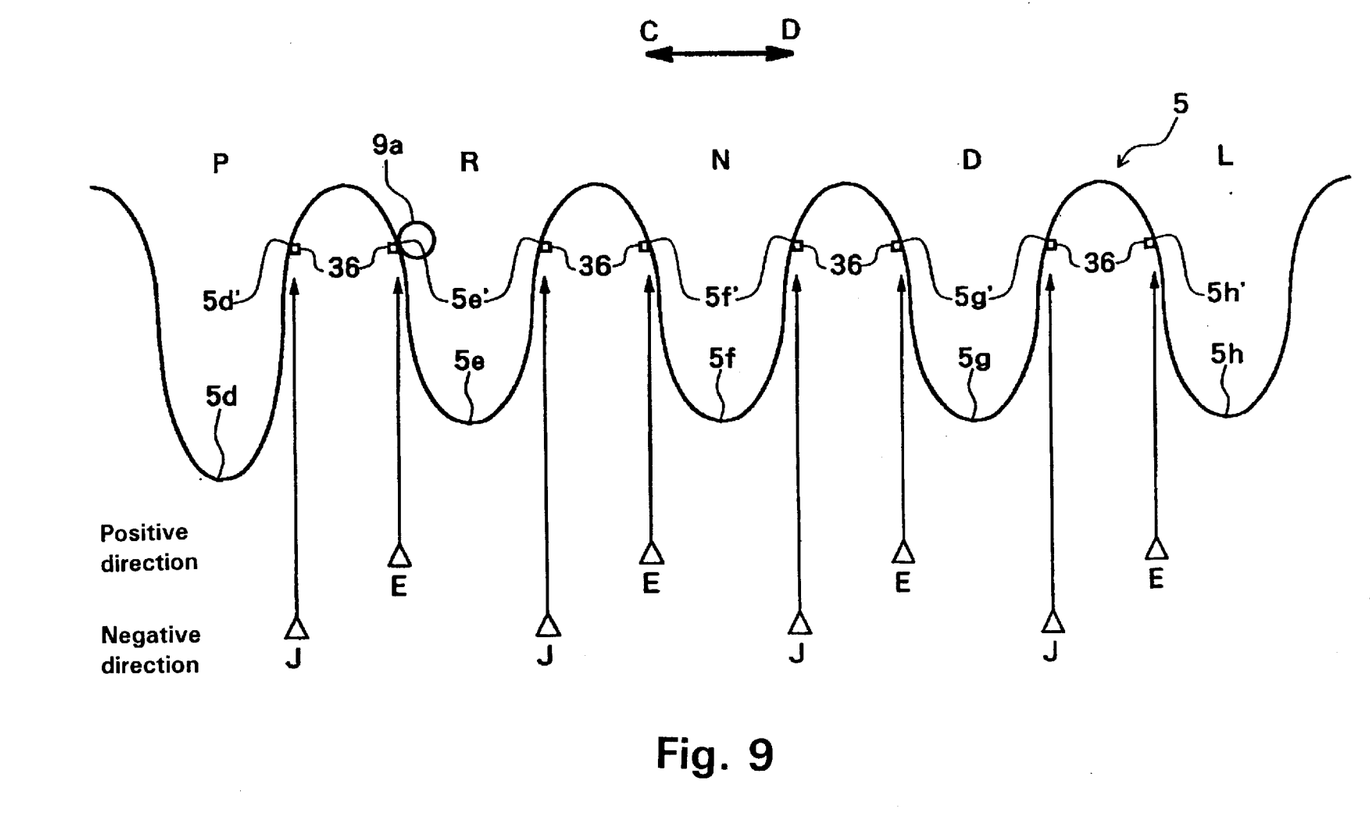
FIG. 9 is a view illustrating inlets corresponding to a rotating direction of the detent lever.

In addition, while an explanation has been given of the operation in the case where the detent lever 5 in the range switchover apparatuses 1, 100 according to the first and second embodiments rotates in the direction of the arrow D, it rotates in some cases in the direction of the arrow C. In FIG. 9, a position of the detent lever relative to the roller 9a at the time of actuation of the brake 18 or at the time of release of the clutch 19 is in the vicinity of a point E (in the vicinity of inlets 5d', 5e', 5f', 5g', 5h') in the case where the detent lever 5 rotates in the direction of the arrow D, and is in the vicinity of a point J (in the vicinity of the inlets 5d', 5e', 5f', 5g', 5h') in the case where the detent lever rotates in the direction of the arrow C. In addition, the range engagement groove indicated by the character 5d is formed to have a valley of greater depth than that of the other range engagement grooves.

Further, because the detent lever 5 is biased by the roller 9a, which is elastically provided on the detent spring 9, it seems that in the case where the roller 9a abuts against an inclined surface of the range engagement groove, the detent lever 5 is caused, by the bias of the roller 9a, to rotate to enable supporting the roller 9a in the valley of the range engagement groove. However, the detent lever 5 is hardly biased by the roller 9a to rotate because of the worm 12b for decelerating the rotation of the motor 12.

According to the invention of the first aspect, the rotation controlling unit adjusts the drive motor so as to make the drive motor rotate at a predetermined rotational speed in response to the state of the environment detected by the environment detecting unit, whereby after the driving force stopping unit prevents transmission of a driving force from the drive motor to the range switchover valve operating unit, the detent mechanism can correctly hold the range switchover valve operating unit in a desired shift position to surely and smoothly perform a shift range switchover of the automatic transmission.

In the case of second aspect of the invention, the stoppage controlling unit transmits a stoppage signal to the driving force stopping unit when the engagement member in the detent mechanism detects a position corresponding to an inlet of a recess corresponding to a predetermined shift position, the detent mechanism can correctly hold the range switchover valve operating unit in a desired shift position to correctly perform switchover of the switchover valve even when a driving force from the drive motor is not transmitted to the range switchover valve driving unit and the range switchover valve driving unit does not stop instantly.

In the third aspect of the invention, when the driving force stopping unit stops the drive motor and actuates the brake, the switchover valve can perform correctly as a result of the rapid stoppage of the drive motor to hold the range switchover valve operating unit in a desired shift position.

As the fourth aspect of the invention, in the case where the driving force stopping unit is a clutch for cutting off a driving force from the drive motor to the switchover valve driving unit, the range switchover valve operating unit can be correctly held in a desired shift position to correctly perform switchover of the switchover valve.

What is claimed is:

1. A range switchover apparatus for automatic transmissions, comprising:

a range switchover means operating unit capable of switching over a switchover means, which switches over a shift range, among respective shift positions;

a drive motor for driving the range switchover means operating unit;

a driving force stopping unit for preventing any driving force from the drive motor from being transmitted to the range switchover means operating unit;

a stoppage controlling unit adapted to detect a position of the range switchover means operating unit to control the driving force stopping unit so as to hold the range switchover means operating unit in a predetermined shift position;

an environment detecting unit for detecting an environment of the drive motor; and a rotation controlling unit for controlling a duty ratio of the drive motor at a predetermined rotational speed in response to a state of the environment detected by the environment detecting unit.

2. The range switchover apparatus for automatic transmissions according to claim 1, wherein the range switchover means comprises:

a detent mechanism for holding the range switchover means operating unit in the respective shift positions, the detent mechanism comprising a plurality of recesses provided on the range switchover means operating unit to correspond to the shift positions, and an engagement member capable of selectively engaging with and disengaging from the recesses, and the stoppage controlling unit detects the engagement member positioning at a position corresponding to an inlet of a recess corresponding to the predetermined shift position whereby the stoppage controlling unit transmits a stoppage signal to the driving force stopping unit.

3. The range switchover apparatus for automatic transmissions according to claim 1, wherein the driving force stopping unit stops the drive motor and actuates a brake.

4. The range switchover apparatus for automatic transmissions according to claim 1, wherein the driving force stopping unit comprises a clutch for cutting off a driving force from the drive motor to the switchover means driving unit.

5. The range switchover apparatus for automatic transmissions according to claim 1, wherein the environment detecting unit comprises a voltage measuring device for measuring an electric source voltage of the drive motor.

6. The range switchover apparatus for automatic transmissions according to claim 1, wherein the environment detecting unit comprises a temperature measuring device for measuring an oil temperature in the automatic transmission.

* * * * *